US011591456B2

(12) United States Patent
Dhanabalan et al.

(10) Patent No.: US 11,591,456 B2
(45) Date of Patent: Feb. 28, 2023

(54) POLYETHYLENE COMPOSITIONS WITH IMPROVED ENVIRONMENTAL STRESS CRACKING RESISTANCE AND METHODS OF USE

(71) Applicant: SABIC GLOBAL TECHNOLOGIES B.V., Bergen op Zoom (NL)

(72) Inventors: Anantharaman Dhanabalan, Geleen (NL); Maria Soliman, Geleen (NL); Anirban Ganguly, Geleen (NL); Sangita Nandi, Geleen (NL); Prem Prakash Pathak, Geleen (NL); Kummetha Raghunatha Reddy, Geleen (NL); Abderrahman Meddad, Geleen (NL); Sadasivam Gopalakrishnan, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 127 days.

(21) Appl. No.: 17/047,584

(22) PCT Filed: Apr. 24, 2019

(86) PCT No.: PCT/EP2019/060467
§ 371 (c)(1),
(2) Date: Oct. 14, 2020

(87) PCT Pub. No.: WO2019/206965
PCT Pub. Date: Oct. 31, 2019

(65) Prior Publication Data
US 2021/0147659 A1 May 20, 2021

Related U.S. Application Data

(60) Provisional application No. 62/662,396, filed on Apr. 25, 2018.

(51) Int. Cl.
*C08L 23/06* (2006.01)
*C08L 23/20* (2006.01)
*C08L 25/08* (2006.01)
*C08L 53/02* (2006.01)

(52) U.S. Cl.
CPC .............. *C08L 23/06* (2013.01); *C08L 23/20* (2013.01); *C08L 25/08* (2013.01); *C08L 53/02* (2013.01); *C08L 2203/10* (2013.01); *C08L 2203/30* (2013.01); *C08L 2207/062* (2013.01)

(58) Field of Classification Search
CPC .................................. C08L 53/02; C08L 23/06
See application file for complete search history.

(56) References Cited

U.S. PATENT DOCUMENTS

| 6,809,154 | B2 | 10/2004 | Lindahl et al. | |
|---|---|---|---|---|
| 6,969,741 | B2 | 11/2005 | Lustiger et al. | |
| 9,481,768 | B1 | 11/2016 | Prince | |
| 2002/0188057 | A1* | 12/2002 | Chen | C08L 53/00 43/42 |
| 2003/0216507 | A1* | 11/2003 | Masubuchi | C08L 75/04 525/66 |
| 2004/0084803 | A1* | 5/2004 | Bonke | B32B 27/32 264/173.14 |
| 2006/0173123 | A1 | 8/2006 | Yang et al. | |
| 2011/0219699 | A1* | 9/2011 | Miyakawa | B60J 10/32 49/490.1 |
| 2012/0111202 | A1* | 5/2012 | Bregman | B01F 35/3202 99/323.1 |
| 2012/0202053 | A1* | 8/2012 | Iseki | C09J 123/22 428/355 EN |
| 2014/0309320 | A1* | 10/2014 | Prince | C08J 9/0061 523/351 |
| 2019/0161604 | A1* | 5/2019 | Tandler | B65D 41/18 |
| 2021/0122914 | A1* | 4/2021 | Gu | C08L 53/02 |

FOREIGN PATENT DOCUMENTS

| CN | 103709483 A | 4/2014 |
|---|---|---|
| EP | 2159041 A2 | 3/2010 |
| WO | 2009064299 A1 | 5/2009 |
| WO | 2009138470 A1 | 11/2009 |

OTHER PUBLICATIONS

International Search Report for International Application No. PCT/EP2019/060467, International Filing Date Apr. 24, 2019, dated Jun. 26, 2019, 5 pages.
Written Opinion for International Application No. PCT/EP2019/060467, International Filing Date Apr. 24, 2019, dated Jun. 26, 2019, 5 pages.

* cited by examiner

*Primary Examiner* — Jeffrey C Mullis
(74) *Attorney, Agent, or Firm* — Cantor Colburn LLP

(57) ABSTRACT

Polymer blends, methods of making the polymer blends, and articles of manufacture that include the polymer blends are described. A polymer blend can include a high density polyethylene (HDPE) polymer and a random block copolymer. The random block copolymer can include two different saturated alkane blocks between aromatic blocks (e.g., two styrenic blocks).

14 Claims, No Drawings

POLYETHYLENE COMPOSITIONS WITH IMPROVED ENVIRONMENTAL STRESS CRACKING RESISTANCE AND METHODS OF USE

CROSS REFERENCE TO RELATED APPLICATIONS

This application is a National Stage application of PCT/EP2019/060467, filed Apr. 24, 2019, which claims the benefit of U.S. Provisional Application No. 62/662,396, filed Apr. 25, 2018.

BACKGROUND

The invention generally concerns polymer blends that include high density polyethylene (HDPE) and a random block copolymer containing two different saturated alkane blocks between aromatic blocks.

Synthetic polymeric materials, particularly thermoplastic resins, are widely used in the manufacturing of a variety of end-use articles ranging from medical devices to food containers. Conventional propylene polymeric materials have long been used in processes like thermoforming, blow molding, coating, etc., requiring high melt strength which could be achieved by increasing molecular weight and broadening of molecular weight distribution. Molecular weight and molecular weight distribution can be modified in the polymerization process itself by choosing particular process conditions and catalysts.

Polypropylene (PP) has widely been used to produce caps and closures. However, to achieve a necessary cap strength, an inner liner (e.g., made from ethylene vinyl acetate (EVA), polyvinylchloride (PVC), butyl rubber, or the like) can be required to achieve the requisite seal properties and organoleptic properties. Such two-layer caps are costly. On the other hand, high density polyethylene (HDPE) typically possesses requisite stiffness, flow properties, and better organoleptic properties for making one-piece closures such as screw caps. However, HDPE mostly lacks in its ability to resist cracking over time (as measured by environmental stress cracking resistance (ESCR) testing). Hence, there is a need to improve ESCR performance of HDPE compositions.

Attempts have been made to improve such performance. By way of example, Chinese Patent Publication No. 103709483 to Gang et al. describes a blend that include a HDPE, hydrogenated styrene-isoprene-styrene, and linear low density polyethylene to improve the ESCR performance of a windshield washer containers. European Patent Application Publication No. 2 159 041 to Orcle et al., describes annealing shaped articles to improve the ESCR properties of the articles. U.S. Pat. No. 6,809,154 to Lindahl et al. describes using sodium benzoate as a nucleating agent responsible for producing high ESCR bimodal HDPE compositions. U.S. Patent Application Publication No. 2006/0173123 to Yang et al., describes adding a polyalphaolefin to a HDPE to increase the ESCR. U.S. Pat. No. 6,969,741 to Lustiger et al. describes blending high molecular weight polyethylene and a low molecular weight polyethylene together to achieve a desired ESCR for rotomolded articles. Given the growing trend of down-gauging of the plastic parts (for example, caps and closure, bottles and containers) and the use of plastics containers for storing aggressive chemicals (bleach bottles), an enhanced ESCR performance of plastics becomes more vital. For instance, a weight reduction of cap from 3 g to 1.8-2.0 g as demanded by brand-owners, while still keeping its ESCR performance, is an emerging challenge.

While various methods exist to increase ESCR properties of polyethylene, many of these suffer in that they are cost ineffective or applicable to method of making the starting polyethylene materials. Thus, there is a continuing need for polyethylene-based compositions of improved ESCR, particularly for those that are suitable for cap and closure applications.

SUMMARY

A discovery has been made that provides a solution to at least some of the problems associated with polyethylene cracking over time (as measured by environmental stress cracking resistance (ESCR) testing). The discovery is premised on a polymer blend that includes a high density polyethylene (HDPE) polymer and a random block copolymer that includes two different saturated alkane blocks between aromatic blocks (e.g., two styrenic blocks).

The polymer blend of the present invention can exhibit an improved ESCR value as compared to the HDPE without the random block copolymer. Further, and as illustrated in a non-limiting manner in the Examples, it was surprisingly found that the articles of manufacture (e.g., caps) that included this polymer blend had a 200 to 1000% increase in time for 50% failure to occur as test specimens made with HDPE without the random copolymer. That is, the blends of the present invention have improved durability due to an increase in ESCR values. Thus, the addition of the random block copolymer provides an elegant and cost effective method to improve the ESCR of high density polyethylenes.

DETAILED DESCRIPTION

In one aspect of the present invention, HDPE polymer blends having improved durability (e.g., more resistant to cracking) are described. A polymer blend can include high density polyethylene (HDPE) and a random block copolymer. The random block copolymer can have two different saturated alkane blocks between two aromatic blocks (e.g., a styrenic blocks). One of the two saturated alkane blocks can include branching. One of the saturated alkane blocks can include branched hydrocarbons (e.g., 1 to 2 hydrocarbon groups extending from the saturated alkane body) while the other saturated alkane block can be a linear hydrocarbon (e.g., a straight chain hydrocarbon having 3 to 5 carbon atoms, preferably 4 carbon atoms). In some embodiments, the random block copolymer can have an average molecular weight of about 250,000 to 450,000 as per polystyrene standard and a polydispersity of 0.9 to 1.2, preferably 1.1 by gel permeation chromatography. In some embodiments, the random block copolymer can have an average molecular weight of from 250,000 to 450,000 g/mol, as per polystyrene standard and/or a polydispersity of 0.9 to 1.2, preferably of 1.0 to 1.1, by gel permeation chromatography. In one particular aspect, the random block copolymer is a hydrogenated styrene-isoprene-butane-styrene random block copolymer. The HDPE used in the polymer blend can be unimodal or bimodal HDPE, and/or has a melt flow index at 190° C. and 2.16 Kg of 0.2 to 2 dg/min. In a particular aspect, the HDPE is bimodal and has a density of 945 to 965 kg/m$^3$. The polymer blend can have a melt flow index of less than 10 g/10 min, preferably less than 5 g/10 min more preferably less than 2 g/10 min. The polymer blend can include from 85.0 wt. % to 99.7 wt. % of the HDPE and 0.1 wt. % to 15 wt. % of the random block copolymer, preferably wherein the random block copolymer is a hydrogenated styrene-isoprene-butadiene-block polymer.

Polymer blends of the present invention can include one or more additives. Additives can include a nucleating agent, a heat conductive agent, a tie agent, an antiblocking agent, an antistatic agent, an antioxidant, a neutralizer/acid scavenger, a blowing agent, a crystallization aid, a dye, a flame retardant agent, a filler, an impact modifier, a mold release agent, an oil, another polymer, a pigment, a processing agent, a reinforcing agent, a stabilizer, an UV resistance agent, a clarifying agent, a slip agent, a flow modifying agent, and combinations thereof. Nucleating agents can include calcium carbonate ($CaCO_3$), barium sulfate ($BaSO_4$), silica ($SiO_2$), kaolin, talc, mica, titania ($TiO_2$), alumina ($Al_2O_3$), zeolite, mono- or polycarboxylic aromatic acid, a dye, a pigment, metal carboxylates, metal aromatic carboxylate, hexahydrophthalic acid metal salts, stearates, organic phosphates, bisamides, sorbitols, or combinations thereof. An amount of additive can vary depending on the desired effect. In some embodiments, the polymer blend can include 0.001 to 1 wt. % of the additive.

In some embodiments, articles of manufacture that include the polymer blend of the present invention are described. Non-limiting examples of articles of manufacture include a film, a molded part, a container, a lid, a sheet, a pipe, a pipe coupling, a bottle, a cup, a tray, a pallet, or a toy, or combinations thereof. The molded part can be a cap, preferably an injection molded and compression molded cap. In some embodiments, a pressurized beverage container cap can include the polymer blend of the present invention. Processes to produce the article of manufacture are also described. Processes can include injection molding, blow molding, compression molding sheet extrusion, film blowing, pipe extrusion, profile extrusion, calendaring, thermoforming, or rotomolding the polymer blend of the present invention to produce the article of manufacture.

The following includes definitions of various terms and phrases used throughout this specification.

The phrases "melt flow rate" (MFR) or "melt flow index" (MRI) refer to the measurement of the ease of flow of the melt of a thermoplastic polymer or blend. MFR values referred to herein are those determined according to ISO 1133 at a temperature of 190° C. with a load of 2.16 kg, preferably in accordance with ISO 1133-1 (2011).

"Density" is the mass of a unit volume of the polymer in g/mL grams of polymer and can be measured at 23° C. according to ASTM D1505, preferably in accordance with ASTM D1505-10.

"Tensile modulus" is a measure of the stiffness of a solid material and can be measured according to ASTM D638 or ISO527-2.

"Tensile strength at yield" is the maximum stress a material can sustain before fracture and can be measured according to ASTM D638 or ISO 527-2.

Percent "tensile elongation at yield" is the maximum stress a material can sustain before fracture and can be measured according to ISO 527-1/2.

Flexural modulus is the ratio of stress to strain in flexural deformation and can be measured according to ISO 527-2.

Flexural strength is stress in a material just before it yields and can be measured according to ISO 527-2.

"Charpy notched impact strength" is a strain-rate test which determine the amount of energy absorbed by a material during fracture and can be measured according to ISO 179.

"Environmental stress cracking resistance (ESCR)" is an environmental stress cracking test where a polyethylene specimen is subjected to the conditions specified in ASTM D1693-15B.

The terms "about" or "approximately" are defined as being close to as understood by one of ordinary skill in the art. In one non-limiting embodiment, the terms are defined to be within 10%, preferably within 5%, more preferably within 1%, and most preferably within 0.5%.

The terms "wt. %", "vol. %", or "mol. %" refers to a weight percentage of a component, a volume percentage of a component, or molar percentage of a component, respectively, based on the total weight, the total volume of material, or total moles, that includes the component. In a non-limiting example, 10 grams of component in 100 grams of the material is 10 wt. % of component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification includes any measurable decrease or complete inhibition to achieve a desired result.

The term "effective," as that term is used in the specification and/or claims, means adequate to accomplish a desired, expected, or intended result.

The use of the words "a" or "an" when used in conjunction with any of the terms "comprising," "including," "containing," or "having" in the claims, or the specification, may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The polymer blends of the present invention can "comprise," "consist essentially of," or "consist of" particular ingredients, components, compositions, etc. disclosed throughout the specification. With respect to the transitional phrase "consisting essentially of," in one non-limiting aspect, a basic and novel characteristic of the polymer blends of the present invention is their increased ESCR values when compared with the ESCR value of unblended HDPE.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

DETAILED DESCRIPTION OF THE INVENTION

A discovery has been made that provides a solution to at least some of the problems associated with processing polyethylene polymers and the articles of manufacture made from such polymers. The solution is premised on blending HDPE with a random block copolymer that has two different saturated alkane blocks between styrenic blocks. Such polymer blends can provide improved performance for molding, extruding, and blowing processes. Notably, materials made from these polymer blends have improved ESCR performance as compared to materials made from HDPE without the random block copolymer.

These and other non-limiting aspects of the present invention are discussed in further detail in the following sections.

A. Materials

1. Polymers

The polymers used in the polymer blend can include polyolefins. Polyolefins can be prepared by any of the polymerization processes, which are in commercial use (e.g., a "high pressure" process, a slurry process, a solution process and/or a gas phase process) and with the use of any of the known catalysts (e.g., multisite catalysts such as Ziegler Natta catalysts, and/or single site catalysts such as chromium or Phillips catalysts, metallocene catalysts, and the like). Non-limiting examples of polyolefins include polyethylenes. Polyethylenes can include homopolymers of ethylene or copolymers of ethylene with at least one alpha olefin (e.g., butene, hexene, octene and the like). In some embodiments the polyethylene is a copolymer with 1-butene (polyethylene-1-butene) or 1-hexene (polyethylene-1-hexene). Non-limiting examples of polyethylenes include low density polyethylene (LDPE), linear low density polyethylene (LLDPE), medium density polyethylene (MDPE), high density polyethylene (HDPE), ethylene copolymers, or blends thereof. The polyethylene can be unimodal, bimodal, or multimodal. Bimodal and/or multimodal HDPE can be made using an advance cascade process. HDPE can be obtained from a commercial vendor. Non-limiting examples of HDPE include SABIC® HDPE CC253 and SABIC® HDPE CC254 (SABIC®, Kingdom of Saudi Arabia). In certain aspects, the polymer blends of the present invention do not include polypropylene or the polymer blend is absent of polypropylene. In some embodiments, the polymer blends do not include linear low density polyethylene (LLDPE).

HDPE can have properties such as a MFR at 190° C. and 2.16 Kg, a density, an ESCR on caps, tensile strength at yield tensile modulus, tensile elongation at yield, Charpy notched impact strength (−30° C.), hardness or combinations thereof. The density of the unimodal and/or bimodal HDPE can be 945 to 965 kg/m$^3$, or at least, equal to, or between any two of 945, 950, 955, 960, and 965 kg/m$^3$. For example, the HDPE may have a density of 945 and 965 kg/m$^3$, as determined in accordance with ATSM D1505-10, preferably 950 and 960 kg/m$^3$. In some embodiments, the HDPE is unimodal. A MFR of unimodal HDPE can be of 0.5 to 2 dg/min or at least, equal to, or between any two of 0.5, 0.75, 1, 1.25, 1.5, 1.75, and 2 dg/min. Tensile modulus and/or flexural modulus of unimodal HDPE can be 1000 to 1300 MPa, or at least, equal to, or between any two of 1000 MPa, 1050 MPa, 1100 MPa, 1150 MPa, 1200 MPa, 1250 MPa, and 1300 MPa as measured by ISO 527-2. Tensile and/or flexural strength at yield of unimodal HDPE can be 20 to 40 MPa, or at least, equal to, or between any two of 20, 25, 30, 35, 40 MPa as measured by ISO 527-2. The ESCR of test specimens made from the blend of the present invention that used unimodal HDPE and the random block copolymer, as inferred from the time for 50% specimens to fail as per ASTM D1693-15B, can be 35 to 110 hours, or about 100 hours.

In some embodiments, the HDPE is bimodal. Bimodal HDPE can have a MFR of 0.5 to 3 g/10 min or at least, equal to, or between any two of 0.5, 0.75, 1, 1.25, 1.5, 1.75, 2, 2.25, 2.5, 2.75, and 3 g/10 min. Tensile modulus of bimodal HDPE can be 1000 to 1300 MPa, or at least, equal to, or between any two of 1000 MPa, 1050 MPa, 1100 MPa, 1150 MPa, 1200 MPa, 1250 MPa and 1300 MPa as measured by ASTM D638. Tensile strength at yield of bimodal HDPE can be 20 to 40 MPa, or at least, equal to, or between any two of 20, 25, 30, 35, 40 MPa as measured by ASTM D638. Charpy notched impart strength at −30° C. can be 3 to 6 kJ/m$^2$ or at least, equal to, or between any two of 3, 4, 5, and 6 kJ/m$^2$. The ESCR of test specimens made from the blend of the present invention that used bimodal HDPE and the random block copolymer, as inferred from the time for 50% specimens to fail as per ASTM D1693-15B, can be 40-170 hours or about 160 hours.

2. Random Block Copolymer

The random block copolymer can be any random block copolymer that has two different saturated alkane blocks positioned between aromatic blocks (e.g., two aromatic blocks). The random block copolymer can be a random ternary block copolymer. A general formula of the random block copolymer can be A-B-C-A where A is aromatic repeating units, block B is a saturated branched alkane repeating unit, and block C is a saturated linear alkane repeating unit. Non-limiting examples of Block A aromatic groups include styrenic or substituted styrenic units. Block B can be a branched saturated alkane unit having 4 to 8 carbon atoms. The branches can include 1 to 2 alkyl groups. Non-limiting examples of block B saturated alkane repeating units includes 1-methyl propane, 2-methyl butane, 2-propyl butane, 2-methyl pentane, 3-methyl pentane, 2,3-dimethyl pentane, 2-propyl pentane, 2-methyl hexane, 2-propyl hexane, 2-methyl heptane, and the like. Block C can be a linear saturated alkane repeating unit having 3 to 8 carbon atoms. Non-limiting examples of block C linear saturated alkanes repeating units includes propane, butane, pentane, hexane, heptane, and octane alkanes. The random block copolymer can have an average molecular weight from about 250,000 to 450,000 (e.g., 250,000; 275,000; 300,000; 325,000; 375,000; 400,000; 425,000; 450,000 or any range or value there between) as per polystyrene standard and a polydispersity of 0.9 to 1.2, preferably 1.1 by gel permeation chromatography. Polystyrene standards include monodispersed polystyrene standards with defined molecular weights that are used to calibrate while determining the molecular weight of new samples. Random block copolymers can be obtained through commercial sources. For example, the random block copolymers sold by Kuraray (Japan) under the tradenames of SEPTON® 4033, 4044, 4055, 4077 and 4099. A non-limiting structure for the random block copolymer is shown below.

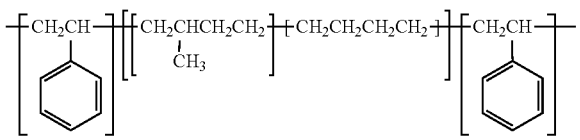

In some embodiments, about 0.1 to 15.0 wt. %, or at least, equal to, or between any two of 0.1, 0.15, 0.2, 0.25, 0.3, 0.5, 0.75, 1.0, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, and 15 wt. % of the random block copolymer based on the weight of polymer blend is used in the blends of the present invention.

For example, the polymer blend may comprise ≥0.1 and ≤15.0 wt %, or 0.1 to 15 wt. %, preferably ≥7.5 and ≤15.0 wt %, more preferably ≥10.0 and ≤15.0 wt %, of the copolymer, preferably with regard to the total weight of the polymer blend. Alternatively, the polymer blend may comprise ≥0.1 and ≤10.0 wt % of the copolymer, or ≥5.0 and ≤10.0 wt %, or ≥7.0 and ≤10.0 wt %, with regard to the total weight of the polymer blend.

For example, the random block copolymer may be a polymer having the structure:

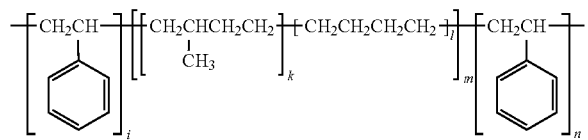

wherein:
the sum of i and n may for example be the weight fraction of polymeric units in the random block copolymer having the chemical structure:

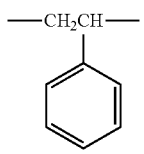

k may for example be the weight fraction of polymeric units in the random block copolymer having the chemical structure:

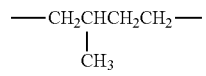

l may for example be the weight fraction of polymeric units in the random block copolymer having the chemical structure

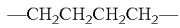

m may for example be the sum of the weight fractions k and l wherein each weight fraction is expressed as percentage with regard to the total weight of the random block copolymer.
Alternatively:
the sum of i and n may for example be the weight fraction of the polymeric units in the random block copolymer derived from styrene;
k may for example be the weight fraction of the polymeric units in the random block copolymer derived from isoprene;
l may for example be the weight fraction of the polymeric units in the random block copolymer derived from butadiene; and
m may be the sum of the weight fractions k and l wherein each weight fraction is expressed as percentage with regard to the total weight of the random block copolymer.

For example, the random block copolymer may comprise ≥10.0 and ≤50.0 wt % of the sum of i and n, preferably ≥15.0 and ≤45.0 wt %, more preferably ≥20.0 and ≤40.0 wt %, even more preferably ≥25.0 and ≤35.0 wt %, with regard to the total weight of the random block copolymer.

For example, the random block copolymer may comprise ≥50.0 and ≤90.0 wt % of m, preferably ≥55.0 wt % and ≤85.0 wt %, more preferably ≥60.0 wt % and ≤80.0 wt %, even more preferably ≥65.0 wt % and ≤75.0 wt %, with regard to the total weight of the random block copolymer.

For example, the random block copolymer may comprise ≥15.0 and ≤55.0 wt % of k, preferably ≥20.0 and ≤50.0, more preferably ≥25.0 and ≤45.0 wt %, even more preferably ≥30.0 wt % and ≤40.0 wt %, with regard to the total weight of the random block copolymer.

For example, the random block copolymer may comprise ≥15.0 and ≤55.0 wt % of l, preferably ≥20.0 and ≤50.0, more preferably ≥25.0 and ≤45.0 wt %, even more preferably ≥30.0 wt % and ≤40.0 wt %, with regard to the total weight of the random block copolymer.

For example, the random block copolymer may comprise ≥25.0 and ≤75.0 wt % of k, preferably ≥30.0 and ≤70.0, more preferably ≥35.0 and ≤65.0 wt %, even more preferably ≥40.0 wt % and ≤60.0 wt %, with regard to the total weight of m.

For example, the random block copolymer may comprise ≥25.0 and ≤75.0 wt % of l, preferably ≥30.0 and ≤70.0, more preferably ≥35.0 and ≤65.0 wt %, even more preferably ≥40.0 wt % and ≤60.0 wt %, with regard to the total weight of m.

For example, the random block copolymer may comprise:
≥25.0 and ≤75.0 wt % of k, preferably ≥30.0 and ≤70.0, more preferably ≥35.0 and ≤65.0 wt %, even more preferably ≥40.0 wt % and ≤60.0 wt %, with regard to the total weight of m; and
≥25.0 and ≤75.0 wt % of l, preferably ≥30.0 and ≤70.0, more preferably ≥35.0 and ≤65.0 wt %, even more preferably ≥40.0 wt % and ≤60.0 wt %, with regard to the total weight of m.
For example, the random block copolymer may comprise:
≥25.0 and ≤75.0 wt % of k, preferably ≥30.0 and ≤70.0, more preferably ≥35.0 and ≤65.0 wt %, even more preferably ≥40.0 wt % and ≤60.0 wt %, with regard to the total weight of m; and
≥25.0 and ≤75.0 wt % of l, preferably ≥30.0 and ≤70.0, more preferably ≥35.0 and ≤65.0 wt %, even more preferably ≥40.0 wt % and ≤60.0 wt %, with regard to the total weight of m; and
≥50.0 and ≤90.0 wt % of m, preferably ≥55.0 wt % and ≤85.0 wt %, more preferably ≥60.0 wt % and ≤80.0 wt %, even more preferably ≥65.0 wt % and ≤75.0 wt %, with regard to the total weight of the random block copolymer.

For example, the weight average molecular weight of the random block copolymer may be >200000 g/mol, preferably >250000, more preferably >300000, even more preferably >350000.

For example, the weight average molecular weight of the random block copolymer may be <550000 g/mol, preferably <500000, even more preferably <450000.

For example, the weight average molecular weight of the random block copolymer may be >200000 g/mol, preferably >250000, more preferably >300000, even more preferably >350000, and <550000 g/mol, preferably <500000, even more preferably <450000.

For example, the weight average molecular weight of the random block copolymer may be >200000 and <550000 g/mol, preferably >250000 and <500000, more preferably >300000 and <450000.

For example, the random block copolymer may have a weight average molecular weight of >200000 and <550000 g/mol, preferably >250000 and <500000, more preferably >300000 and <450000, and the random block copolymer may be a polymer having the structure:

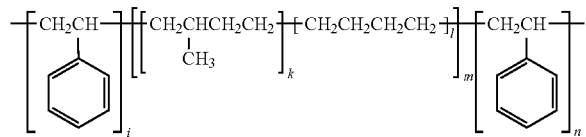

wherein
the sum of i and n may for example be the weight fraction of the polymeric units in the random block copolymer derived from styrene;
k may for example be the weight fraction of the polymeric units in the random block copolymer derived from isoprene;
l may for example be the weight fraction of the polymeric units in the random block copolymer derived from butadiene;
m may be the sum of the weight fractions k and l;
wherein each weight fraction is expressed as percentage with regard to the total weight of the random block copolymer;
and wherein
the random block copolymer comprises ≥10.0 and ≤50.0 wt % of the sum of i and n, preferably ≥15.0 and ≤45.0 wt %, more preferably ≥20.0 and ≤40.0 wt %, even more preferably ≥25.0 and ≤35.0 wt %, with regard to the total weight of the random block copolymer;
the random block copolymer comprises:
≥25.0 and ≤75.0 wt % of k, preferably ≥30.0 and ≤70.0, more preferably ≥35.0 and ≤65.0 wt %, even more preferably ≥40.0 wt % and ≤60.0 wt %, with regard to the total weight of m; and
≥25.0 and ≤75.0 wt % of l, preferably ≥30.0 and ≤70.0, more preferably ≥35.0 and ≤65.0 wt %, even more preferably ≥40.0 wt % and ≤60.0 wt %, with regard to the total weight of m; and
≥50.0 and ≤90.0 wt % of m, preferably ≥55.0 wt % and ≤85.0 wt %, more preferably ≥60.0 wt % and ≤80.0 wt %, even more preferably ≥65.0 wt % and ≤75.0 wt %, with regard to the total weight of the random block copolymer.

3. Additives

The polymer compositions of the present invention can further include at least one additive. Non-limiting examples of additives include an antiblocking agent, an antistatic agent, an antioxidant, a neutralizing agent, an acid scavenger, a blowing agent, a crystallization aid, a dye, a flame retardant, a filler, an impact modifier, a mold release agent, an oil, another polymer, a pigment, a processing agent, a reinforcing agent, a nucleating agent, a clarifying agent, a slip agent, a flow modifier, a stabilizer, an UV resistance agent, and combinations thereof Additives are available from various commercial suppliers. Non-limiting examples of commercial additive suppliers include BASF (Germany), Dover Chemical Corporation (U.S.A.), AkzoNobel (The Netherlands), SigmaMillipore (U.S.A.), Atofina Chemicals, Inc., Milliken (U.S.A.) and the like.

a. Nucleating Agents

Non-limiting examples of nucleating agents include nucleating agent comprises calcium carbonate ($CaCO_3$), barium sulfate ($BaSO_4$), silica ($SiO_2$), kaolin, talc, mica, titania ($TiO_2$), alumina ($Al_2O_3$), a zeolite, mono- or poly-carboxylic aromatic acid, a dye, a pigment, metal carboxylates, metal aromatic carboxylate, hexahydrophthalic acid metal salts, stearates, organic phosphates, bisamides, sorbitols, or a combination thereof. A non-limiting example of metal aromatic carboxylate includes sodium benzoate.

b. Light Stabilizers

In certain aspects, at least, equal to, or between any two of 0.01 wt. %, 0.2 wt. %, 0.3 wt. %, 0.4 wt. %, 0.5 wt. %, 0.6 wt. %, 0.7 wt. %, 0.8 wt. %, 0.9 wt. %, and 1.0 wt. % of the composition is a light stabilizer. The light stabilizer can be a hindered amine light stabilizer. The term "hindered amine light stabilizer" refers to a class of amine compounds having certain light stabilizing properties. Non-limiting examples, of hindered amine light stabilizers (HALS) include 1-cyclohexyloxy-2,2,6,6-tetramethyl-4-octadecylaminopiperidine; bis(2,2,6,6-tetramethylpiperidin-4-yl) sebacate; bis(1-acetoxy-2,2,6,6-tetramethylpiperidin-4-yl) sebacate; bis(1,2,2,6,6-pentamethylpiperidin-4-yl) sebacate; bis(1-cyclohexyloxy-2,2,6,6-tetramethylpiperidin-4-yl) sebacate; bis(1-octyloxy-2,2,6,6-tetramethylpiperidin-4-yl) sebacate; bis(1-acyl-2,2,6,6-tetramethylpiperidin-4-yl) sebacate; bis(1,2,2,6,6-pentamethyl-4-piperidyl) n-butyl-3,5-di-tert-butyl-4-hydroxybenzyl malonate; 2,4-bis[(1-cyclohexyloxy-2,2,6,6-tetramethylpiperidin-4-yl)butylamino]-6-(2-hydroxyethyl amino-s-triazine; bis(1-cyclohexyloxy-2,2,6,6-tetramethylpiperidin-4-yl) adipate; 2,4-bis[(1-cyclohexyloxy-2,2,6,6-piperidin yl)butylamino]-6-chloro-s-triazine; 1-(2-hydroxy-2-methylpropoxy)-4-hydroxy-2,2,6,6-tetramethylpiperidine; 1-(2-hydroxy-2-methylpropoxy)-4-oxo-2,2,6,6-tetramethylpiperidine; 1-(2-hydroxy-2-methyl propoxy)-4-octadecanoyloxy-2,2,6,6-tetramethyl piperidine; bis(1-(2-hydroxy-2-methylpropoxy)-2,2,6,6-tetramethylpiperidin-4-yl) sebacate; bis(1-(2-hydroxy-2-methylpropoxy)-2,2,6,6-tetramethylpiperidin-4-yl) adipate; 2,4-bis{N-[1-(2-hydroxy-2-methyl propoxy)-2,2,6,6-tetramethylpiperidin-4-yl]-N-butylamino}-6-(2-hydroxyethylamino)-s-triazine; 4-benzoyl-2,2,6,6-tetramethylpiperidine; di-(1,2,2,6,6-pentamethylpiperidin-4-yl) p-methoxybenzylidenemalonate; 2,2,6,6-tetramethylpiperidin-4-yloctadecanoate; bis(1-octyloxy-2,2,6,6-tetramethylpiperidyl) succinate; 1,2,2,6,6-pentamethyl-4-aminopiperidine; 2-undecyl-7,7,9,9-tetramethyl-1-oxa-3,8-diaza-4-oxo-spiro[4,5]decane; tris(2,2,6,6-tetramethyl-4-piperidyl) nitrilotriacetate; tris(2-hydroxy-3-(amino-(2,2,6,6-tetramethylpiperidin-4-yl)propyl) nitrilotriacetate; tetrakis(2,2,6,6-tetramethyl-4-piperidyl)-1,2,3,4-butane-tetracarboxylate; tetrakis(1,2,2,6,6-pentamethyl-4-piperidyl)-1,2,3,4-butane-tetracarboxylate; 1,1'-(1,2-ethanediyl)-bis(3,3,5,5-tetramethylpiperazinone); 3-n-octyl-7,7,9,9-tetramethyl-1,3,8-triazaspiro[4.5]decan-2,4-dione; 8-acetyl-3-dodecyl-7,7,9,9-tetramethyl-1,3,8-triazaspiro[4.5]decane-2,4-dione; 3-dodecyl-1-(2,2,6,6-tetramethyl-4-piperidyl)pyrrolidin-2,5-dione; 3-dodecyl-1-(1,2,2,6,6-pentamethyl-4-piperidyl) pyrrolidine-2,5-dione; N,N'-bis-formyl-N,N'-bis(2,2,6,6-tetramethyl-4-piperidyl)hexamethylenediamine; reaction product of 2,4-bis[(1-cyclohexyloxy-2,2,6,6-piperidin-4-yl) butylamino]-6-chloro-s-triazine with N,N'-bis(3-aminopropyl)ethylenediamine; condensate of 1-(2-hydroxyethyl)-2,2,6,6-tetramethyl-4-hydroxypiperidine and succinic acid; condensate of N,N'-bis(2,2,6,6-tetramethyl-4-piperidyl)- hexamethylenediamine and 4-tert-octylamino-2,6-dichloro-1,3,5-triazine; condensate of N,N'-bis(2,2,6,6-tetramethyl-4-piperidyl)-hexamethylenediamine and 4-cyclohexylamino-2,6-dichloro-1,3,5-triazine; condensate of N,N'-bis-(2,2,6,6-tetramethyl-4-piperidyl)hexamethylenediamine and 4-morpholino-2,6-dichloro-1,3,5-triazine; condensate of N,N'-bis-(1,2,2,6,6-pentamethyl-4-piperidyl)hexamethylenediamine and 4-morpholino-2,6-dichloro-1,3,5-triazine; condensate of 2-chloro-4,6-bis(4-n-butylamino-2,2,6,6-tetramethyl piperidyl)-1,3,5-triazine and 1,2-bis(3-aminopropylamino)ethane; condensate of 2-chloro-4,6-di-(4-n-butylamino-1,2,2,6,6-pentamethylpiperidyl)-1,3,5-triazine and 1,2-bis-(3-aminopropylamino)ethane; a reaction product of 7,7,9,9-tetramethyl-2-cycloundecyl-1-oxa-3,8-diaza-4-oxospiro[4,5]decane and epichlorohydrin; poly[methyl,(3-oxy-(2,2,6,6-tetramethylpiperidin-4-yl)propyl)]siloxane, CAS #182635-99-0; reaction product of maleic acid anhydride-C18-C22-α-olefin-copolymer with 2,2,6,6-tetramethyl-4-aminopiperidine; oligomeric condensate of 4,4'-hexamethylenebis(amino-2,2,6,6-tetramethylpiperidine) and 2,4-dichloro [(2,2,6,6-tetramethylpiperidin-4-yl)butylamino]-s-triazine end-capped with 2-chloro-4,6-bis(dibutylamino)-s-triazine; oligomeric condensate of 4,4'-hexamethylenebis(amino-1,2,2,6,6-pentaamethylpiperidine) and 2,4-dichloro-6-[(1,2,2,6,6-pentaamethylpiperidin-4-yl)butylamino]-s-triazine end-capped with 2-chloro-4,6-bis(dibutylamino)-s-triazine; oligomeric condensate of 4,4'-hexamethylenebis(amino-1-propoxy-2,2,6,6-tetramethyl piperidine) and 2,4-dichloro-6-[(1-propoxy-2,2,6,6-tetramethylpiperidin-4-yl)butylamino]-s-triazine end-capped with 2-chloro-4,6-bis(dibutylamino)-s-triazine; oligomeric condensate of 4,4'-hexamethylenebis(amino-1-acyloxy-2,2,6,6-tetramethyl piperidine) and 2,4-dichloro-6-[(1-acyloxy-2,2,6,6-tetramethylpiperidin-4-yl)butylamino]-s-triazine end-capped with 2-chloro-4,6-bis(dibutylamino)-s-triazine; and product obtained by reacting (a) with (b) where (a) is product obtained by reacting 1,2-bis(3-aminopropylamino) ethane with cyanuric chloride and (b) is (2,2,6,6-tetramethyl piperidin-4-yl)butylamine. Also included are the sterically hindered N—H, N-methyl, N-methoxy, N-hydroxy, N-propoxy, N-octyloxy, N-cyclohexyloxy, N-acyloxy and N-(2-hydroxy-2-methylpropoxy) analogues of any of the above mentioned compounds. Non-limiting examples of commercial light stabilizer are available from BASF under the trade name Uvinul® 4050H, 4077H, 4092H, 5062H, 5050H, 4092H, 4077H, 3026, 3027, 3028, 3029, 3033P, and 3034 or Tinuvin® 622.

c. Antistatic Agent

Anti-static agents can be used to inhibit accumulation of dust on plastic articles. Antistatic agents can improve the electrical conductivity of the plastic compositions, and thus dissipate any surface charges, which develop during production and use. Thus, dust particles are less attracted to the surface of the plastic article, and dust accumulation is consequently reduced. In certain aspects of the present invention, the antistatic agent can be a glycerol monostearate. A composition of the invention can include 0.01 wt. %, 0.2 wt. %, 0.3 wt. %, 0.4 wt. %, 0.5 wt. %, 0.6 wt. %, 0.7 wt. %, 0.8 wt. %, 0.9 wt. %, and 1 wt. % of total anti-static agent based on the total with of the composition.

d. Lubricant

A lubricant can be added to a thermoplastic polymer to improve the mold-making characteristics. The lubricant can be a low molecular compound from a group of fatty acids, fatty acid esters, wax ester, fatty alcohol ester, amide waxes, metal carboxylate, montanic acids, montanic acid ester, or such high molecular compounds, as paraffins or polyethylene waxes. In certain aspects of the present invention, the lubricant is a metal stearate. Non-limiting examples of metal stearates include zinc stearate, calcium stearate, lithium stearate or a combination thereof, preferably calcium stearate. A composition of the invention can include at least, equal to, or between any two of 0.01 wt. %, 0.2 wt. %, 0.3 wt. %, 0.4 wt. %, 0.5 wt. %, 0.6 wt. %, 0.7 wt. %, 0.8 wt. %, 0.9 wt. %, and 1 wt. % of total lubricant based on the total weight of the composition.

e. Antioxidant

An antioxidant can provide protection against polymer degradation during processing. Phosphites are known thermal oxidative stabilizing agents for polymers and other organic materials. The antioxidant can be a phosphite-based antioxidant. In certain aspects phosphite-antioxidants include, but are not limited to, triphenyl phosphite, diphenylalkyl phosphites, phenyldialkyl phosphites, tris(nonylphenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl)pentaerythritol diphosphite tristearyl sorbitol triphosphite, and tetrakis(2,4-di-tertbutylphenyl)-4,4'-biphenylene diphosphonite, bis(2,4-dicumylphenyl)pentaerythritol diphosphite. A composition of the invention can include at least, equal to, or between any two of 0.01 wt. %, 02 wt. %, 0.3 wt. %, 0.4 wt. %, 0.5 wt. %, 0.6 wt. %, 0.7 wt. %, 0.8 wt. %, 0.9 wt. %, and 0.1 wt. % of total antioxidant based on the total weight of the composition. Non-limiting examples of commercially available antioxidants include Irganox 1010 available from BASF, or Doverphos S9228T available from Dover Chemical Company.

B. Preparation of Polymer Blends

The addition of the HDPE, random block copolymer, and additives can be carried out in a customary mixing machine, in which the HDPE or random block copolymer can be melted and mixed with the optional additives. The optional additives can be added at the end of a processing step to produce the polymer blend. Suitable machines are known to those skilled in the art. Non-limiting examples include mixers, kneaders, extruders, and molders. In certain aspects, the process can be carried out in an extruder and introduction of the additives during processing. Non-limiting examples of extruder can include single-screw extruders, counter-rotating and co-rotating twin-screw extruders, planetary-gear extruders, ring extruders, or co-kneaders. It is also possible to use processing machines provided with at least one gas removal compartment to which a vacuum can be applied. In some embodiments, the HDPE containing random block copolymer and one or more optional additives used to produce the polymer blend of the present invention can be melt-extruded by following typical procedures of weighing required amounts of the HDPE, copolymer and other additives, followed by dry blending, and then feeding the mixture into a main feeder of the twin-screw co-rotating extruder (length/diameter (L/D) ratio of 25:1 or 40:1) to obtain the final composition. The HDPE, random block copolymer, or blend thereof can be subjected to an elevated temperature for a sufficient period of time during blending. The blending temperature can be above the softening point of the polymers. In certain aspects, a process can be performed at a temperature from about 160° C. to 280° C. The copolymer can be added along with other additives in-line, prior to pelletization of HDPE resin during the production process. The amounts of HDPE to random block copolymer can be adjusted as long as the weight ratio of HDPE to random block copolymer is 5:1 up to 999:1. The HDPE:

random block copolymer weight ratio can be at least, equal to, or between any two of 5:1, 5.5:1, 10:1, 15:1, 20:1, 30:1, 40:1, 50:1, 60:1, 70:1, 80:1, 90:1, 100:1, 150:1, 200:1, 250:1, 300:1, 350:1, 450:1, 500:1, 600:1, 700:1, 800:1, 900:1, 950:1, and 999:1.

Additives can be premixed or added individually to the polymer blend or the random block copolymer. By way of example, the additives of the present invention can be premixed such that the blend is formed prior to adding it to the HDPE or the random block copolymer. The additive containing blend thereof can be subjected to an elevated temperature for a sufficient period of time during blending and/or incorporation of additives. Incorporation of additives into the polyolefin resin can be carried out, for example, by mixing the above-described components using methods customary in process technology. The blending temperature can be above the softening point of the polymers. In certain aspects, a process can be performed at a temperature from about 160° C. to 280° C. Such "melt mixing" or "melt compounding" results in uniform dispersion of the present additives in the HDPE or the random block copolymer.

C. Polymer Blend

The polymer blends can include HDPE and random block copolymer in the ratios described above. In some embodiments, the polymer blend can include at least, equal to, or between any two of 0.1 wt. %, 1 wt. %, 1.5 wt. %, 2 wt. %, 2.5 wt. %, 3 wt. %, 3.5 wt. %, 4 wt. %, 4.5 wt. %, 5 wt. %, 5.5 wt. %, 6 wt. %, 6.5 wt. %, 7 wt. %, 7.5 wt. %, 8 wt. %, 8.5 wt. %, 9 wt. %, 9.5 wt. %, 10 wt. %, 10.5 wt. %, 11 wt. %, 11.5 wt. %, 12 wt. %, 12.5 wt. %, 13 wt. %, 13.5 wt. %, 14 wt. %, 14.5 wt. %, and 15 wt. % of the random block copolymer. An amount of HDPE can be at least, equal to, or between any two of 85 wt. %, 85.5 wt. %, 90 wt. %, 90.5 wt. %, 95 wt. %, 95.5 wt. %, and 99.9 wt. %. In some embodiments, the blend can include 0.1 wt. % to 15 wt. % random block copolymer and 85 wt. % to 99.9 wt. % HDPE. In another embodiment, the blend can include 0.5 wt. % to 10 wt. % random block copolymer and 99.5 wt. % to 80 wt. % HDPE. In yet another embodiment, the blend can include 1 wt. % to 5 wt. % random block copolymer and 99 wt. % to 95 wt. % of HDPE. The polymer blend can have a melt flow rate (MFR) of less than 10 g/10 min, preferably less than 5 g/10 min more preferably less than 2 g/10 min, or at less than, equal to, or between any two of 10, 9, 8, 7, 6, 5, 4, 3, 2, 1 g/10 min.

Articles of manufacture (e.g., caps) that include the polymer blend of the present invention can have a higher ESCR than articles of manufacture made from HDPE without the random block copolymer (e.g., the HDPE used to prepare the blend). In some embodiments, the articles of manufacture of the present invention have an ESCR that is 200 to 1000% greater than the ESCR values of HDPE articles of manufacture used in the blend prior to adding the random block copolymer. The ESCR values can be at least, equal to, or between any two of 200, 300, 400, 500, 600, 700 800, 900 and 1000% greater than ESCR HDPE values without the random block copolymer. As exemplified in the Examples section and throughout the specification, polymer blend containing articles of manufacture s of the present invention can have an ESCR values from at least 20 hours to 200 hours (e.g., 20, 30, 40, 50, 60, 70, 80, 90, 100, 110, 120, 130, 140, 150, 160, 170, 180, 190, 200, and any range or value there between). In contrast HDPE articles of manufacture without the random block copolymer, can have an ESCR values of less than but not equal to 20 hours (e.g., 10, 13, and 16 hours).

D. Articles of Manufacture

The polymer blend compositions are normally collected as pellets, which can be stored for a time or employed immediately in a forming process. The forming processes can include injection molding, blow molding, compression molding, sheet extrusion, film blowing, pipe extrusion, profile extrusion, calendaring, thermoforming, rotomolding, or combinations thereof. The final formed articles can be, for instance, molded parts, sheets, films, or fibers. Examples of molded parts include a cap, a container, a lid, a sheet, a pipe, a pipe coupling, a bottle, a cup, a tray, a pallet, or a toy, or combinations thereof. Caps can be injection and/or compression molded. Such caps can be used in a variety of food and non-food examples. By way of example, caps that include the polymer blend of the present invention can be used in carbonated beverages, pressurized beverages, or the like.

EXAMPLES

The present invention will be described in greater detail by way of specific examples. The following examples are offered for illustrative purposes only, and are not intended to limit the invention in any manner. Those of skill in the art will readily recognize a variety of noncritical parameters which can be changed or modified to yield essentially the same results.

Materials. HDPE obtained from SABIC. HDPE-A is SABIC® HDPE CC253, a unimodal HDPE having a density of 952 kg/cm$^3$ and a melt flow rate of 1.8 dg/min as determined at 190° under a load of 2.16 kg. HDPE-B is SABIC® HDPE CC254, a bimodal HDPE having a density of 953 kg/m$^3$ and a melt flow rate at 190°/2.16 kg of 2.1 dg/min. A unimodal HDPE may typically be produced using one catalyst in one single reactor, and typically possesses a relatively narrow molecular weight distribution, such as for example of between 3 and 6. The molecular weight distribution is the ratio of the weight average molecular weight Mw and the number average molecular weight Mn. A bimodal HDPE may for example be produced in a process using two reactors in series, which each may be operated under separate process conditions, which may be the same or different between the reactors. A bimodal HDPE typically possesses a mixture of low molecular weight polymer chains and high molecular weight polymer chains, and typically has a relatively broad molecular weight distribution, such as for example of over 10.

The random block copolymer samples, SEPTON® 2002, 4033, 4055, 4077 and 4099, were obtained from Kuraray (JAPAN). Gel permeation analysis of the copolymer is listed in Table 1. SEPTON 2002 is a styrene-isoprene-styrene (SEPS) block copolymer; SEPTON 4033, 4055, 4077 and 4099 are styrene-butane-isoprene-styrene block copolymers (SEEPS).

TABLE 1

| Sl. No. | Sample Details | Mn | Mw | Mw/Mn |
|---|---|---|---|---|
| 1 | SEPTON ® 4055 | 248620 | 275237 | 1.1 |
| 2 | SEPTON ® 4077 | 318447 | 364190 | 1.1 |
| 3 | SEPTON ® 4099 | 372013 | 423727 | 1.1 |
| 4 | SEPTON 2002 | 40000 | 45000 | 1.1 |
| 5 | SEPTON 4033 | 77000 | 85000 | 1.1 |

Example 1

Required amounts of HDPE and random block copolymer were weighed, dry blended and fed into main feeder of the twin-screw co-rotating extruder (length/diameter (L/D) ratio of 25:1 or 40:1). ESCR and melt flow rate data for the blends of the present invention that include HDPE and the random block copolymer are listed in Table 2. Table 2 lists ESCR data for the blends and comparative HDPE samples that do not include the random block copolymer, and MRF data for the blends of the present invention and comparative samples. From the data, it was determined that the ESCR properties of the polymer blends that included the HDPE and random block copolymer were better than those of HDPE without the random block copolymer. In table 2, all weight percentages reflect the weight percentage of the particular polymer with regard to the total weight of the polymer blend. The ESCR herein is the time for 50% of samples to fail in ASTM D1693B-15, expressed in hours, with a typical standard deviation of 10-20%, and the MFR is the melt flow rate at 2.16 kg/190° C., expressed in dg/min.

TABLE 2

| | HDPE (wt %) | | SEPTON block copolymer (wt %) | | | | | | |
|---|---|---|---|---|---|---|---|---|---|
| Ex. | A | B | 2002 | 4033 | 4055 | 4077 | 4099 | ESCR | MFR |
| 1 | 100 | | | | | | | 13 | 1.80 |
| 2 | | 100 | | | | | | 16 | 1.97 |
| 3 | 90 | | 10 | | | | | 16 | |
| 4 | 95 | | 5 | | | | | 8 | |
| 5 | 90 | | | 10 | | | | 18 | |
| 6 | 97 | | | 3 | | | | 20 | |
| 7 | 99 | | | 1 | | | | 16 | |
| 8 | 90 | | | | 10 | | | 40 | 0.98 |
| 9 | 93 | | | | 7 | | | 27 | 1.20 |
| 10 | 90 | | | | | 10 | | 83 | 0.65 |
| 11 | 95 | | | | | 5 | | 24 | 1.17 |
| 12 | 90 | | | | | | 10 | 130 | 0.42 |
| 13 | 95 | | | | | | 5 | 29 | 0.90 |
| 14 | 85 | | | 15 | | | | 42 | 0.30 |
| 15 | 85 | | | | | | 15 | 134 | 0.15 |
| 16 | | 90 | 10 | | | | | 106 | |
| 17 | | 95 | 5 | | | | | 40 | 1.48 |
| 18 | | 97 | | 3 | | | | 26 | |
| 19 | | 99 | | 1 | | | | 22 | |
| 20 | | 90 | | | 10 | | | 103 | |
| 21 | | 95 | | | 5 | | | 43 | |
| 22 | | 90 | | | | 10 | | 166 | 0.70 |
| 23 | | 95 | | | | 5 | | 45 | |
| 24 | | 85 | | | | | 15 | 172 | 0.15 |
| 25 | | 85 | | 15 | | | | 113 | 0.35 |

The invention claimed is:

1. A polymer blend comprising high density polyethylene (HDPE) and a random block copolymer comprising two different saturated alkane blocks between two aromatic hydrocarbon blocks, wherein the polymer blend comprises from 85 wt. % to 99.7 wt. % of the high density polyethylene and 0.1 wt. % to 15 wt. % of the random block copolymer, each based on a total weight of the polymer blend, wherein the random block copolymer is a hydrogenated styrene-isoprene-butadiene-styrene block polymer, and wherein:
when the HDPE is unimodal, it has a melt flow index at 190° C. and 2.16 Kg of 0.5 to 2 dg/min; or
when the HDPE is bimodal, it has a melt flow index at 190° C. and 2.16 Kg of 0.5 to 3 g/10 min;
wherein the melt flow index is determined according to ISO 1133.

2. Polymer blend according to claim 1, wherein the HDPE has a density of ≥945 and ≤965 kg/m³, as determined in accordance with ASTM D1505-10.

3. The polymer blend according to claim 1, wherein the polymer blend comprises 7.5 wt. % to 15 wt. %, of the copolymer, with regard to the total weight of the polymer blend.

4. Polymer blend according to claim 1, wherein the random copolymer is a polymer having the structure:

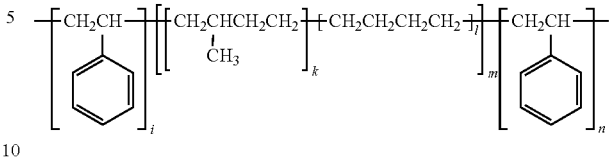

wherein:
the sum of i and n is the weight fraction of polymeric units in the random block copolymer having the chemical structure:

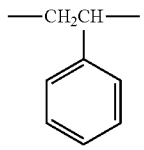

k is the weight fraction of polymeric units in the random block copolymer having the chemical structure:

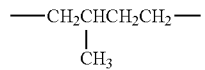

l is the weight fraction of polymeric units in the random block copolymer having the chemical structure
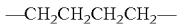

m is the sum of the weight fractions k and l
wherein each weight fraction is expressed as percentage with regard to the total
weight of the random block copolymer.

5. Polymer blend according to claim 4, wherein:
the random block copolymer comprises ≥10.0 and ≤50.0 wt % of the sum of i and n, with regard to the total weight of the random block copolymer; and/or
the random block copolymer comprises:
≥25.0 and ≤75.0 wt % of k, with regard to the total weight of m; and
≥25.0 and ≤75.0 wt % of l, with regard to the total weight of m; and
≥50.0 and ≤90.0 wt % of m, with regard to the total weight of the random block copolymer.

6. Polymer blend according to claim 1, wherein the random block copolymer has a weight average molecular weight of >200000 and <550000 g/mol, as determined per polystyrene standard.

7. The polymer blend of claim 1, wherein the random block copolymer has an average molecular weight about 250,000 to 450,000 as per polystyrene standard and a polydispersity of 1.0 to 1.1 by gel permeation chromatography.

8. The polymer blend of claim 1, wherein the polymer blend is absent of polypropylene.

9. An article of manufacture comprising the polymer blend of claim 1.

10. The article of manufacture of claim 9, wherein the article of manufacture is a molded part, and the molded part is a cap.

11. The article of manufacture of claim 10, wherein the article of manufacture is a pressurized beverage container cap.

12. The polymer blend of claim 1, wherein one of the two saturated alkane blocks comprises branching.

13. The polymer blend according to claim 3, wherein the polymer blend comprises ≥10 and ≤15.0 wt % of the copolymer with regard to the total weight of the polymer blend.

14. An article of manufacture comprising a polymer blend comprising high density polyethylene (HDPE) and a random block copolymer comprising two different saturated alkane blocks between two aromatic hydrocarbon blocks, wherein the polymer blend comprises from 85 wt. % to 99.7 wt. % of the high density polyethylene and 0.1 wt. % to 15 wt. % of the random block copolymer, each based on a total weight of the polymer blend, and wherein the random block copolymer is a hydrogenated styrene-isoprene-butadiene-styrene block polymer, and wherein the article of manufacture is a molded part, and the molded part is a cap.

\* \* \* \* \*